United States Patent
Gu

(10) Patent No.: US 11,893,403 B1
(45) Date of Patent: Feb. 6, 2024

(54) AUTOMATION SERVICE

(71) Applicant: Amazon Technologies, Inc., Seattle, WA (US)

(72) Inventor: Ran Gu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/811,276

(22) Filed: Nov. 13, 2017

(51) Int. Cl.
| | |
|---|---|
| *G06F 9/455* | (2018.01) |
| *H04L 67/025* | (2022.01) |
| *H04L 67/60* | (2022.01) |
| *G06F 9/445* | (2018.01) |

(52) U.S. Cl.
CPC ...... *G06F 9/45558* (2013.01); *G06F 9/44505* (2013.01); *H04L 67/025* (2013.01); *H04L 67/60* (2022.05); *G06F 2009/45562* (2013.01)

(58) Field of Classification Search
None
See application file for complete search history.

(56) References Cited

U.S. PATENT DOCUMENTS

| | | | | |
|---|---|---|---|---|
| 9,336,020 | B1* | 5/2016 | Oweis | G06F 9/44505 |
| 2007/0174776 | A1* | 7/2007 | Ghattu | G06F 9/45512 |
| | | | | 715/733 |
| 2015/0304175 | A1* | 10/2015 | Maes | G06F 8/70 |
| | | | | 709/226 |
| 2017/0315789 | A1* | 11/2017 | Lam | G06Q 10/067 |
| 2018/0081642 | A1* | 3/2018 | Alurralde Iturri | G06F 8/36 |
| 2018/0095772 | A1* | 4/2018 | Wu | H04W 88/02 |
| 2018/0253194 | A1* | 9/2018 | Javadi | G06F 3/0486 |
| 2018/0307464 | A1* | 10/2018 | Bijani | G06F 8/34 |
| 2019/0018657 | A1* | 1/2019 | Landowski | G06F 8/34 |

* cited by examiner

*Primary Examiner* — Wynuel S Aquino
(74) *Attorney, Agent, or Firm* — BakerHostetler

(57) ABSTRACT

A computing service may include a user interface and an associated programming interface which is invoked by interaction with the user interface. An automation service may receive information indicative of a series of interactions with the user interface that result in an invocation of the programming interface. The automation service may generate code comprising instructions for invoking the programming interface, the instructions based on the invocation caused by interaction with the user interface. The generated code may be shared. When executed, the generated code may reproduce the effects of the interaction with the user interface.

21 Claims, 8 Drawing Sheets

AUTOMATION SERVICE

BACKGROUND

Computing functions are increasingly being provided through hosted services. Examples of such functions include the provision of flexible computing capacity by virtual machines, the provision of network-based databases and storage systems, and so on. In order to make use of these services, a user may typically be required to step through a series of configuration steps. This process may be complex, tedious, and/or prone to error. At the same time, it may sometimes be necessary to repeat these configuration steps, or to share information about which configuration steps were performed.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
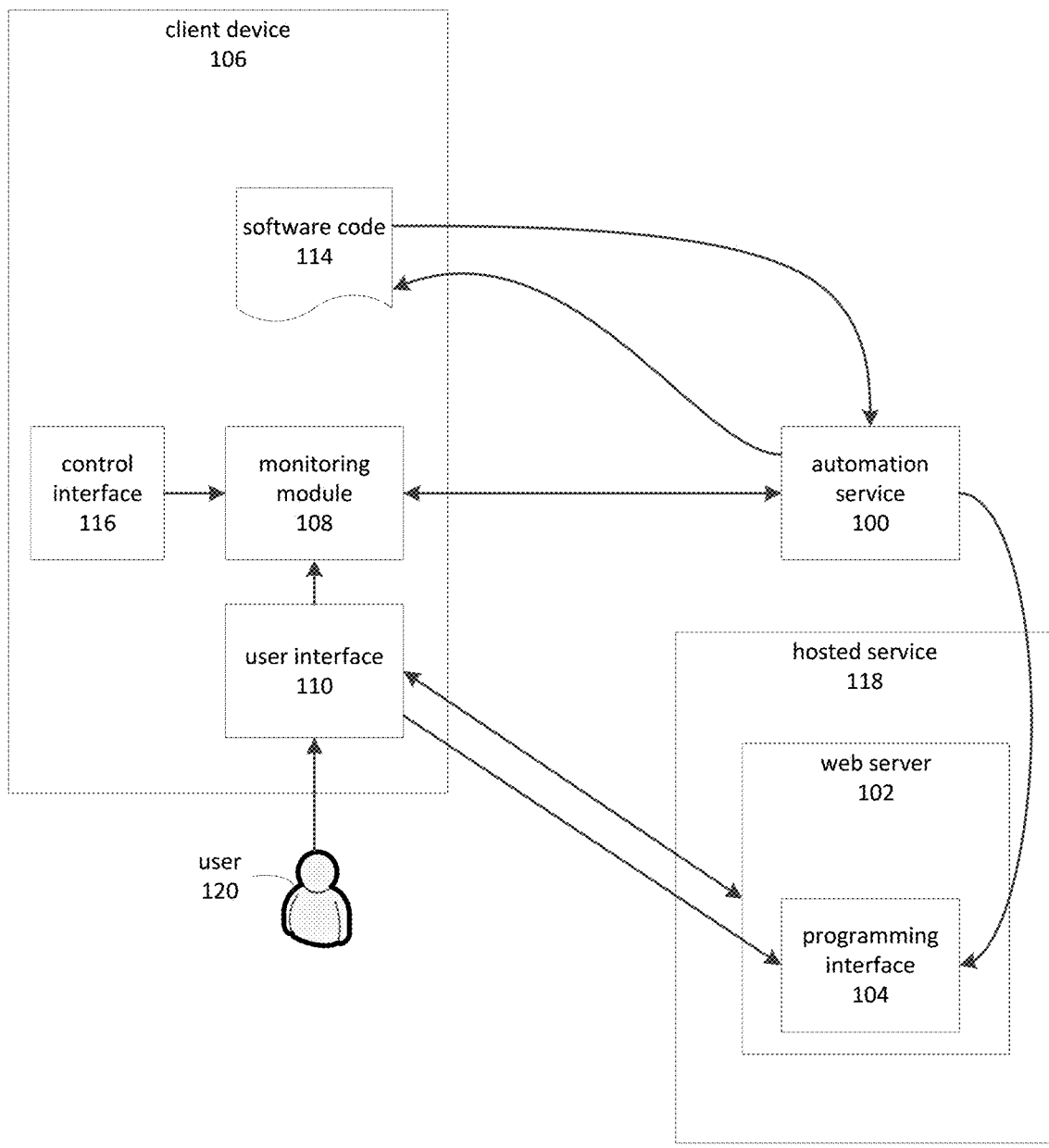
FIG. 1 depicts an embodiment of an automation service.

Embodiments of systems, methods, and computer program products may facilitate automation of configuration operations for a hosted service. In an embodiment, a hosted service provides a configuration user interface. The configuration interface is accessible by a user interface. An application programming interface is also provided, and in various aspects is utilized by the user interface to accomplish configuration tasks.

In an embodiment, an automation service receives information describing configuration actions taken by a user via the provided user interface. The automation service translates these configuration actions into software code which comprises calls to the application programming interfaces. When executed, the software code performs automation tasks corresponding to the automation tasks performed by the user via the user interface.

In an embodiment, the translation from configuration actions to software code comprises determining which application programming interface calls were invoked as a consequence of the configuration actions taken by the user. The translation may further comprise identifying any actions taken by the user interface that were preparatory to the application programming interface invocations.

The software code may be provided to the user or shared with others. In an embodiment, the software code is software source code that may be viewed and understood by the users. Viewing and sharing the code may permit the configuration actions to be submitted to a help desk for analysis, used with others for education of IT support staff, and so on. The software source code may also be edited and re-run without having to repeat steps previously taken manually.

In an embodiment, a system comprises a memory to store machine-readable instructions. The machine-readable instructions, when performed by at least one processor of the system, cause the system to perform operations for automating hosted services interactions. The operations comprise receiving information indicative of a series of interactions with a user interface and determining that the series of interactions resulted in an invocation of a programming interface. The programming interface may be one provided by the hosted service, for example as a web service. The system performs further operations comprising generating code to invoke the hosted service in a manner parallel to the invocation that occurred as a result of the series of interactions with the user interface. The system may then provide the generated code to a client device. Subsequently, the code may be executed to reproduce the effects of the user's interaction with the user interface.

In an embodiment, a method of providing automation services comprises receiving information indicative of a plurality of interactions with a user interface. The method further comprises identifying an invocation of a programming interface which resulted from the interactions, and generating code which comprises a second invocation of the programming interface. The second invocation is based on the first invocation. The method further comprises providing the generated code to a client device.

In an embodiment, a method of automating a hosted web service comprises providing a user interface to the service, coupled with a programming interface performing a function of the hosted web service. The method further comprises providing a client device with a module for monitoring user interactions with the service. The method further comprises receiving, from the provided module, information indicative of a series of interactions with the user interface, and identifying an invocation of the programming interface based on the interactions. The method further comprises generating code which comprises instructions for a second invocation of the programming interface, where the second invocation is based on the invocation which occurred as a result of the user's interactions with the user interface. The code may then be provided to a client device and subsequently executed. When executed, the code substantially reproduces the effect of the user's interaction with the user interface.

FIG. 1 depicts an embodiment of an automation service. In an embodiment, an automation service 100 receives data from a client device 106 indicative of a series of interactions with a user interface 110, such as configuration actions performed by one or more users using the user interface 110. The automation service 100 identifies invocations of a programming interface 104 that occur as a result of interaction by user 120 with the user interface 110. The automation service 100 generates software code 114 to comprise instructions that, when executed, cause similar invocations of the programming interface 104 to occur. The software code 114 generated by the automation service 100 may therefore represent a recording of the interaction with the user interface, represented as code that may be stored, shared with others, examined, and/or executed upon request.

In an embodiment, the automation service 100 receives a request to execute the software code 114. Upon receiving the request, the automation service 100 executes the software code 114 in order to invoke the programming interface 104. As explained, the invocation corresponds to, e.g. mirrors, the invocation of the programming interface 104 that was previously triggered via interaction with the user interface 110.

In an embodiment, the automation service 100 receives a request to record the interactions of a user with the user interface 110. The request may be received from a client device 106 on which a user interface 110 is being used. For example, a user of the client device 106 may be performing steps to configure a computing facility (not depicted) by interacting with the user interface 110. The user might, for example, be configuring the properties of a virtual machine, hosted web service, storage service, distributed database, and so on. The user may wish to record the configuration steps so that they may be subsequently repeated, shared with others, or sent to support personnel for analysis. It will be appreciated that these examples are intended to be illustrative, and as such should not be construed as limiting.

In an embodiment, the automation service 100 provides, or activates, a monitoring module 108 on the client device 106. The monitoring module 108 may comprise code executed by at least one processor of the client device 106. The monitoring module 108 may establish hooks or intercepts into the code of the user interface 110 in order to monitor user interaction with the user interface 110. In an embodiment, the monitoring module 108 registers to receive events indicative of interactions with the user interface 110. For example, in an embodiment the monitoring module 108 receives an event notifying it that the user has interacted with a button, spin box, edit control, checkbox, or other element of the user interface 110. In an embodiment, the monitoring module 108 receives notification when a user selects a menu item or presses the "OK" button of a dialog box.

In an embodiment, the client device 106 is a computing device comprising a memory to store machine readable instructions, and at least one processor to execute those instructions. The client device may comprise a network interface for communicating with the web server 102, automation service 100, and programming interface 104.

In an embodiment, the monitoring module 108 receives events indicative of invocations of a programming interface. The events are received in response to invocations caused by interaction with the user interface 110. For example, in an embodiment the monitoring module 108 registers for and receives an event indicative of an invocation, initiated by the user interface 110, of the programming interface 104. In an embodiment, the notification is sent from the user interface 110 to the monitoring module 108. In an alternative embodiment, the notification is sent from the operating system of the client device 106. In another embodiment, the notification is sent from the programming interface 104.

In an embodiment, the automation service 110 receives information indicative of interactions with the user interface 110. In an embodiment, the information comprises an indication of one or more invocations of the programming interface 104 that occurs as a result of the user's interaction with the user interface 110. In an embodiment, the information is sent for a period of time for which the user has indicated that recording of actions should take place. In an embodiment, the user interacts with a control interface 116, which may provide user interface elements such as "record," "pause," and "stop" buttons.

In an embodiment, the automation service 100 analyzes the information indicative of interactions with the user interface 110 and generates software code 114. The software code 114 is generated to comprise instructions for invoking the programming interface 104 in the same manner as was done by the user's interaction with the user interface 110. For example, the interaction with the user interface 110 may have caused the programming interface 104 to be invoked with a certain combination of parameters. The automation service 100 may therefore generate software code 114 to comprise instructions to invoke the programming interface 104 with the same combination of parameters. In this manner, the consequence of invoking the programming interface 104 by execution of the software code 114 may be similar to or the same as the initial invocation by the user interface 110.

In an embodiment, the programming interface 104 is a function. In cases and embodiments, the function is defined by an identifier, such as "print" in the function definition "int print(string s)." In cases and embodiments, the function may have a return type, such as "int" in the aforementioned function definition. In cases and embodiments, the function may accept one or more parameters, such as "string s" in the aforementioned function definition. The function may be invoked by storing the parameters, if any, in an appropriate location and transferring the flow-of-control of a program to the function.

In an embodiment, the programming interface 104 is a function of a web service. For example, a web service may comprise a number of methods each exposed as representational state transfer ("REST") methods. Each programming interface 104 may therefore be associated with an identifier of the method to be performed an a format for providing any required or optional parameters. The corresponding function may be invoked by initiating a hypertext transfer protocol ("HTTP") request that complies with the REST protocol.

It will be appreciated that the aforementioned embodiments of a programming interface 104 are intended to be illustrative, and should not be construed as limiting the scope of the present disclosure to only the examples provided. Other examples of programming interfaces include, but are not limited to, wire protocols, object-oriented interfaces, procedural interfaces, and so on.

In an embodiment, a hosted service 118 comprises a web server 102 and at least one programming interface 104. In an embodiment, the programming interface 104 is implemented as a web service interface on the web server 102.

In an embodiment, the user interface 110 is provided by a web server 102. The web server 102 may, for example, provide hypertext markup language ("HTML") code, or other code, which may implement the user interface 110. In an embodiment, HTML code is provided by web server 102 to a browser application running on the client device 106. The user interface 110, in this embodiment, is therefore implemented by the browser and the code provided by the web server 102.

In an embodiment, the web server 102 provides the client device 106 with executable instructions for the monitoring module 108. For example, the web server 102 may facilitate the downloading of application code for the monitoring module 108, and send messages causing the monitoring module 108 to be activated on the client 106.

In an embodiment, the monitoring module 108 is provided with information which identifies aspects of the user interface 110 which are related to invocations of a programming interface 104 which might be invoked as a consequent of a user's interaction with the user interface 110. The information might be used, for example, to enable the monitoring module 108 to detect events which trigger an invocation of the programming interface 104, and to extract parameters provided to the programming interface 104 by the invocation.

In an embodiment, the software code 114 comprises source-code instructions. The source-code instructions may be viewed and edited by a user. In an embodiment, the source-code may comprise scripting-language instructions which are executable using a runtime or interpreter program. In another embodiment, the source-code may be compiled into processor-executable instructions and then executed.

In an embodiment, the software code 114 is compiled code, such as processor-executable instructions or intermediate-level instructions executable via a runtime.

In an embodiment, the automation service 100 receives software code 114 and executes it on behalf of a client device 106. The automation service 100 may, in an embodiment, provide a runtime or other resources needed to execute the software code 114 on behalf of the client device 106.

In an embodiment, the software code 114 is executed directly by the client device 106. In this embodiment, the software code 114, when executed, invokes the programming interface 104 from the client device 106. In an embodiment, the programming interface 104 comprises a hosted web service interface and is invoked by HTTP messages sent by executing the software code 114.

Figure 2:
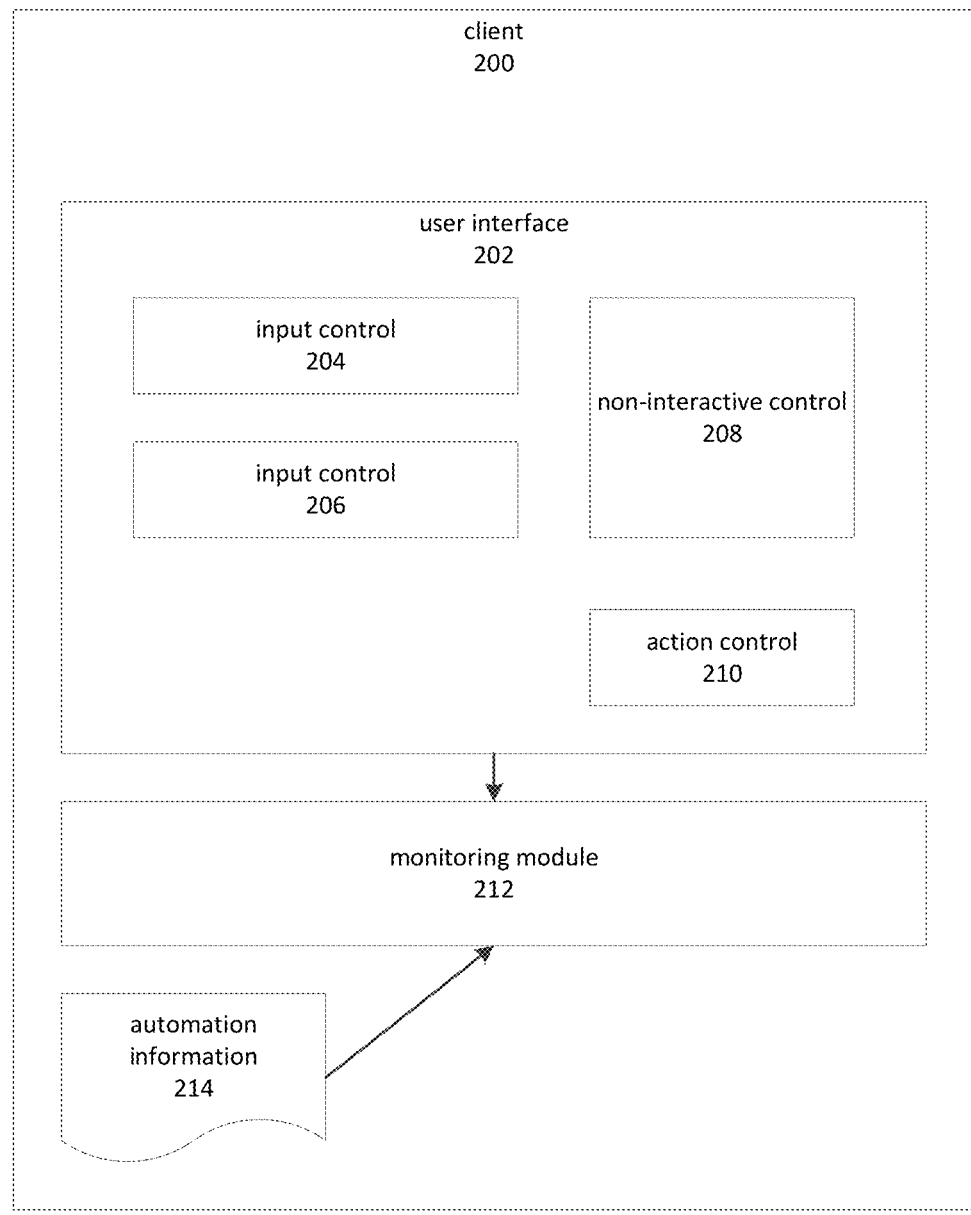
FIG. 2 depicts an embodiment of a user interface monitored by an automation service.

FIG. 2 depicts an embodiment of a user interface monitored by an automation service. A user interface 202 may be provided to a user of a client device 200. The user interface 202 may be provided via instructions executed by a processor of the client 200.

In an embodiment, the user interface 202 comprises input controls 204, 206, a non-interactive control 208, and an action control 210. It will be appreciated that this depiction is intended to be illustrative, and as such the depicted example should not be construed as limiting.

In an embodiment, the input controls 204, 206 may accept user input. For example, in a user interface designed for configuring an instance of a virtual machine, the input controls 204, 206 might accept user input designating the name of the virtual machine and the number of virtual processors to be assigned to the virtual machine. The input controls 204, 206 may be any of various types of user interface elements, including but not limited to edit controls, check boxes, radio boxes, spin controls, and so on. The input controls 204, 206 may provide information relevant to the invocation of a programming interface. Continuing the example, the name of the virtual machine and the number of virtual processors might be provided as parameters to the invocation of the programming interface.

In an embodiment, a non-interactive control 208 may provide information to the user of the user interface 202. In some cases and embodiments, the non-interactive control might contain information relevant to the invocation of a programming interface.

In an embodiment, an action control 210 may indicate that some action be taken. In general terms, the action may be subdivided into two categories—actions that are preparatory to the invocation of a programming interface, and actions that trigger the invocation. An action control 210 might correspond to a button, menu item, or similar user interface element.

In an embodiment, the monitoring module 212 may receive automation information 214 which enables it to access and monitor aspects of the user interface 202 which are relevant to the invocation of a programming interface. The automation information may comprise data identifying which aspects of the user interface are important, including those elements of the user interface that trigger the invocation of a programming interface. In an embodiment, the monitoring module 212 filters interaction events so that only those relevant to automating the invocation of the programming interface are recorded and/or transmitted.

In an embodiment, the user automation information 214 is not provided to the monitoring module 212. Instead, the user interface 202 is programmed to provide relevant information to the monitoring module 212. In a further embodiment, the monitoring module 212 subscribes to events relevant to programming interface, and the events are subsequently triggered as appropriate by the user interface 202.

Figure 3:
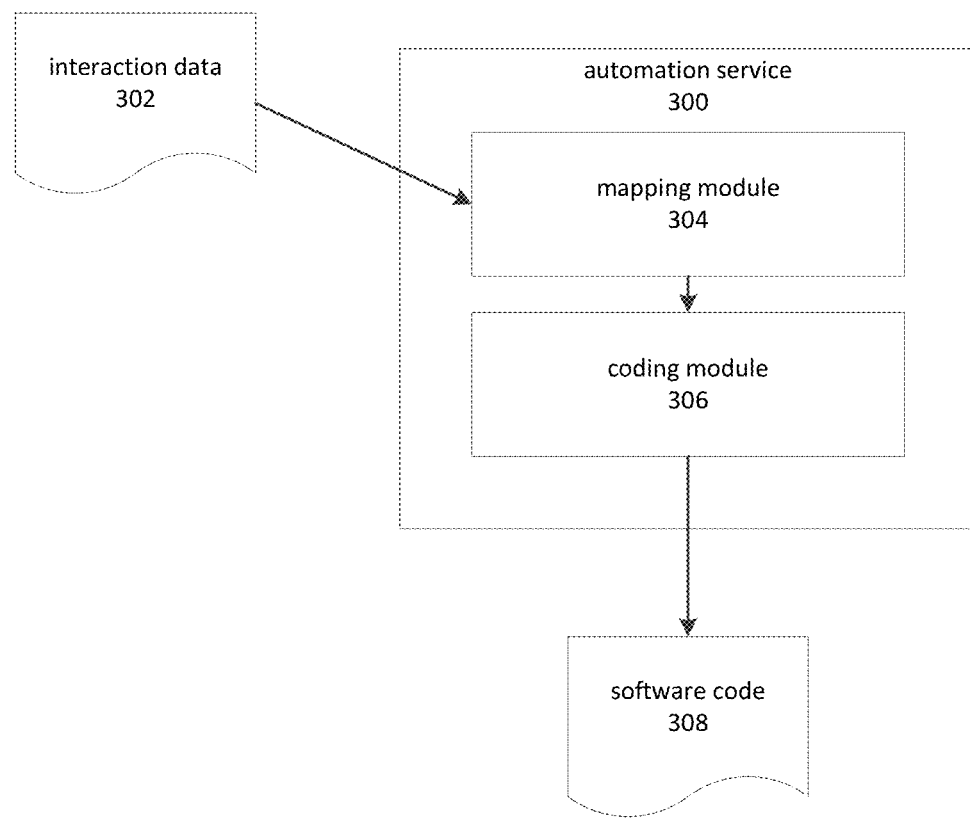
FIG. 3 depicts aspects of an embodiment of an automation service.

FIG. 3 depicts aspects of an embodiment of an automation service. In an embodiment, an automation service 300 is hosted by a service provider. The service provider, in cases and embodiments, hosts additional services whose use may be automated via the automation service 300. For example, the service provider might host virtual machines, and provide the user with a configuration interface whose use might be automated. As a component of this service, the service provide may expose a programming interface, for example via a web service, that initializes a virtual machine according to parameters provided by the user in the configuration interface. The automation service 300 might be employed to capture the user's actions within the user interface, including the invocation of the programming interface to initialize the web service.

In an embodiment, the automation service 300 receives interaction data 302. The interaction data comprises information indicative of a user's interaction with a user interface, up to an including an interaction which triggers the invocation of a programming interface. In an embodiment, this information is provided by a monitoring module 212 as depicted in FIG. 2.

In an embodiment, the interaction data 302 is processed by a mapping module 304. The mapping module 304 identifies events that triggered invocations of programming interfaces, and may also identify events and data preparatory to the invocation. The mapping module 304 may also extract, from the interaction data, information needed by the coding module 306.

In an embodiment, the coding module 306 generates code 308 comprising instructions to invoke a programming interface. The invocation defined by the generated code corresponds to the invocation performed as a consequence of interaction with the user interface. For example, the coding module 306 may generate the code so that the same parameters are passed to the programming interface. In some instances, the invocations are not exactly equivalent. For example, in cases and embodiments certain parameters might be replaced with values supplied by a template, replaced with automatically generated values, or not included in the generated code.

In an embodiment, the coding module 306 excludes parameters based on security implications. In another embodiment, the interaction data 302 does not include data deemed to be sensitive due to security or privacy concerns, and the coding module 306 replaces these with placeholders. These may be replaced prior to the code 308 being executed.

Figure 4:
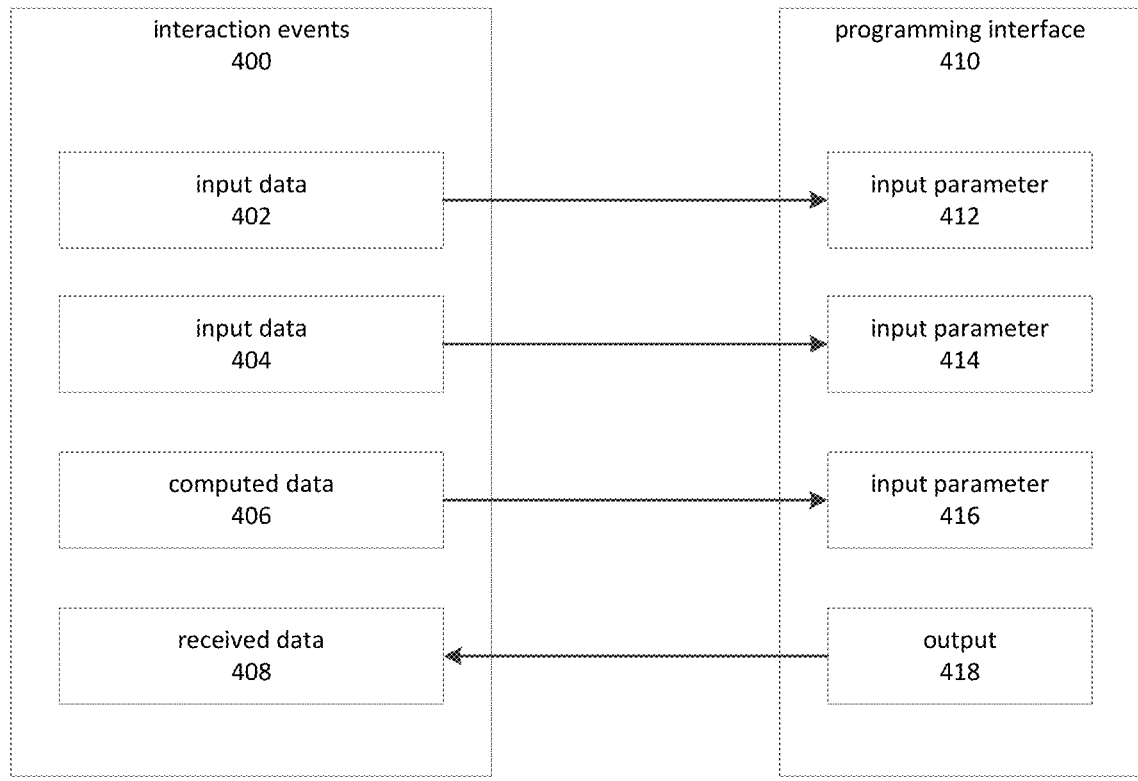
FIG. 4 depicts aspects of an embodiment of mapping user interface interaction to a programming interface.

FIG. 4 depicts aspects of an embodiment of mapping user interface interaction events 400 to a programming interface. As depicted by FIG. 4, a programming interface 410 may comprise various input parameters 412, 414, 416. The input parameters 412, 414, 416 may be required to by the programming interface 410, for example to specify particular aspects of the operation performed by the programming interface 410.

In an embodiment, the programming interface 400 also comprises an output 414. In cases and embodiments, the output 414 is one of an input/output parameter, an output-only parameter, or a return value. The output 418 may, for example, indicate whether or not an operation performed by the invocation of the programming interface 410 was a success. Note that in some cases and embodiments, the output 418 may be used within the user interface for a subsequent purpose, including the invocation of another programming interface. In some cases and embodiments, a series of interactions with a user interface may result in a number of programming interface invocations. In some instances, these may be strung together, the output of one invocation feeding into the next. In such instances, a mapping process may determine the relationships between outputs and inputs, including whether any inputs are linked to outputs and if any transformative operations are performed on the outputs. If such operations occur, embodiments of the automation service may include instructions to perform corresponding operations in the generated code. Whether or not transformative or linking operations are required, in cases and embodiments the generated code may comprise a series of invocations corresponding to those invoked during the user interface interaction.

Figure 5:
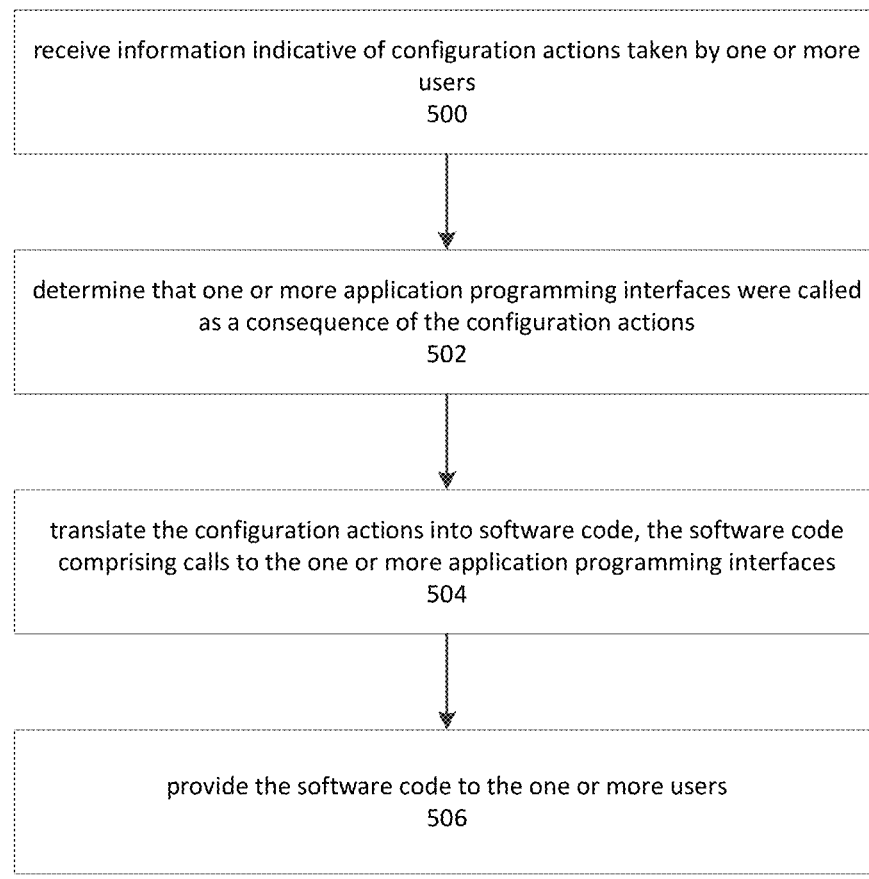
FIG. 5 is a flow diagram depicting operations of an embodiment of an automation service.

FIG. 5 is a flow diagram depicting operations of an embodiment of an automation service. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments may be implemented in a system comprising a memory and at least one processor. The memory may comprise computer-executable instructions that, when executed by a computing system, cause the computing system to perform operations corresponding to the depicted elements. Further examples of such systems are described herein.

Element 500 depicts an embodiment receiving information indicative of configuration actions taken by one or more users. In an embodiment, the information is received from a monitoring module which monitors a user's interactions with a configuration user interface. The monitoring module may track a user's interaction with the configuration user interface and identify those interactions which are relevant to the invocation of application programming interfaces. In an embodiment, the automation service transmits, to the monitoring module, information indicative of a mapping between elements of the configuration interface and an application programming interface. In another embodiment, the automation service transmits information indicative of user interface elements that the monitoring module should track, without transmitting a mapping between those elements and a programming interface. In another embodiment, the automation service does not transmit information to the monitoring module.

Element 502 depicts an embodiment determining that one or more application programming interfaces were called as a result of the configuration actions taken by the user or users. In an embodiment, an automation service determines that application programming interfaces were called by analyzing the configuration action information and determining which programming interfaces were invoked by those actions. In a further aspect of a further embodiment, the automation service also identifies actions that were performed preparatory to each call to an application programming interface, determines which values were supplied in the calls, and determines how those values were derived. In cases and embodiments, this may include values derived based on input from the user interface and values derived by calling application programming interfaces.

Element 504 depicts an embodiment translating the configuration actions into software code that includes calls to the application programming interfaces that were invoked as a result of the configuration actions. In an embodiment, this comprises generating software code to initialize any parameters to be used by an application programming interface, and generating software code to invoke the application programming interface with those parameters. In an embodiment, the automation service also generates code including instructions to perform functions that are preparatory to the invocation of an application programming interface. The coded instructions may correspond to preparatory actions performed by the user interface. For example, a user interface might normalize input values (e.g. by removing beginning and trailing spaces, or standardizing date formats) prior to supplying the normalized input values to a programming interface. In an embodiment, the automation service generates software code that, when executed, performs the same normalization function, or performs an equivalent function. In an embodiment, the automation service performs these functions based in part on metadata which describes the user interface and its relationship to the programming interface(s) that the user interface invokes. This metadata may be received by the automation service from a web service that comprises the application programming interface.

Element 506 depicts providing the generated software code to the one or more users. The software code may be provided a number of ways. In an embodiment, the software code is transmitted over a network to a client device accessible to a user. In another embodiment, the software code is stored in a repository by the automation service and made available to users on request. The software code may be viewed, edited, and/or executed at the request of a user.

When executed, the generated code causes the programming interface to perform an operation that corresponds to the operation that was performed when the user interface invoked the programming interface.

In an embodiment, the generated code is executable by the client. The generated code may, for example, comprise intermediate code executable by a runtime or by a processor of the client device.

In an embodiment, the generated code is executable by the automation service. The automation service may receive the generated code from the client then invoke the programming interface by executing the generated code.

Figure 6:
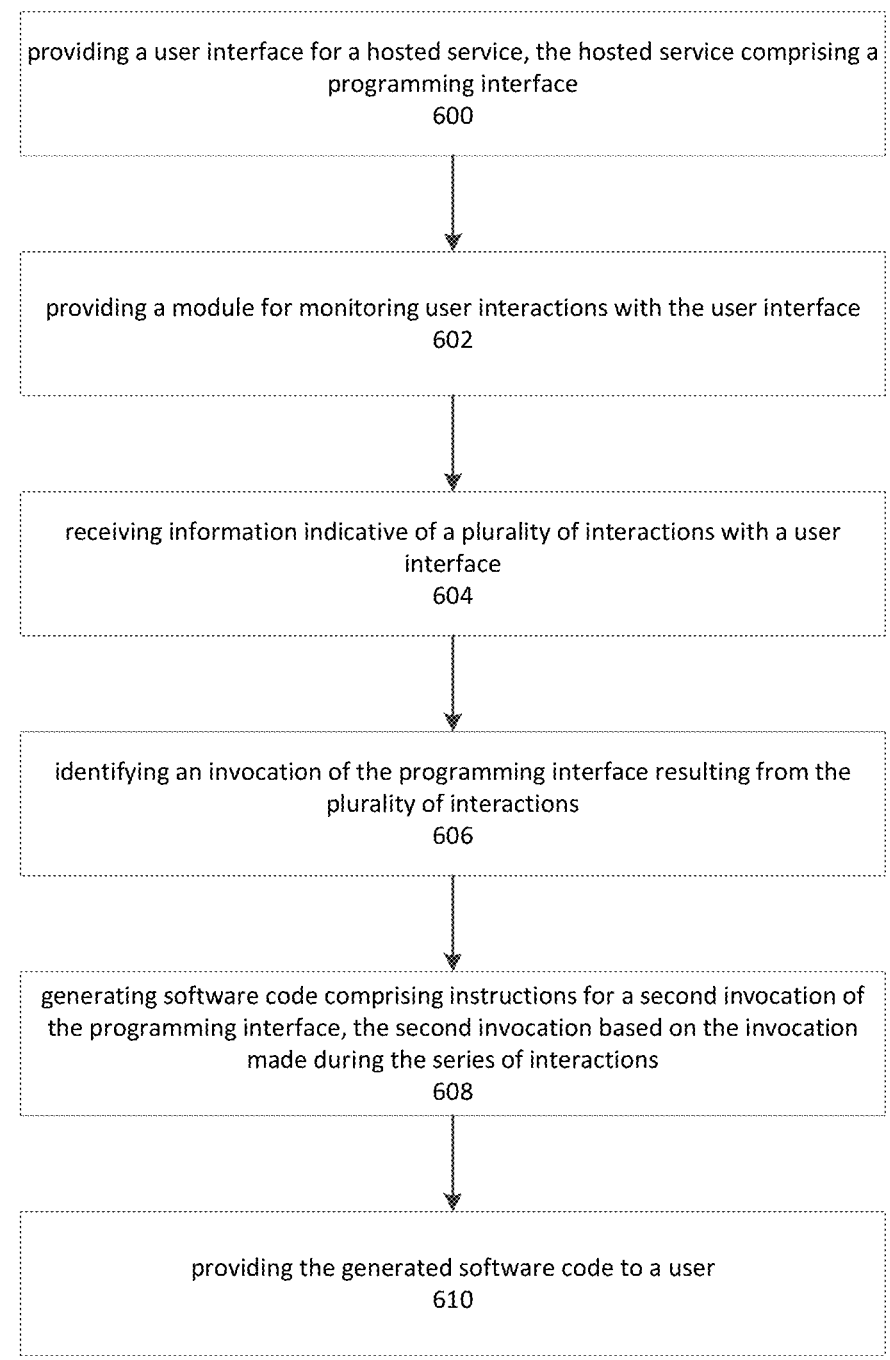
FIG. 6 is a flow diagram depicting an embodiment of a process for providing automation to a hosted service.

FIG. 6 is a flow diagram depicting an embodiment of a process for providing automation to a hosted service. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments may be implemented in a system comprising a memory and at least one processor. The memory may comprise computer-executable instructions that, when executed by a computing system, cause the computing system to perform operations corresponding to the depicted elements. Further examples of such systems are described herein.

Element 600 depicts an embodiment providing a user interface for a hosted service, where the hosted service also comprises a programming interface. In an embodiment, selected features of the hosted service are selected for automation. The features, based on being selected, are surfaced as both user interfaces and as programming interfaces. However, one-to-one correspondence between a user interface and programming interface is not required. For example, a user interface may expose a particular feature to an end-user, whereas the same feature might be invoked by the user interface by calling a plurality of programming interfaces.

In an embodiment, the programming interfaces are a component of and accessible via a web service. In some cases and embodiments, the programming instances may be made available only for the use of the user interface and the automation service. In other cases and embodiments, the programming interfaces are also directly accessible to users. In an embodiment, this latter approach is used to permit a client device to directly executed code generated by the automation service.

Element 602 depicts an embodiment providing a module for monitoring user interactions with the user interface. In an embodiment, the automation service transmits and activates a monitoring module on a device hosting the user interface. In some cases and embodiments, the monitoring module is activated on a client device. In an embodiment, an instance of client-executable code is activated and executes on the client to record interactions with the user interface. In other cases and embodiments, the monitoring module may be activated on a server, such as a web server, which receives indications of a user's interaction with a user interface.

In an embodiment, the automation service receives a request to record interactions with a user interface. In response, the monitoring module may be transmitted and/or activated on the appropriate device. In an embodiment, the monitoring module remains active until the user pauses or terminates the recording of user interactions. In an embodiment, the automation service responds to the termination of recording by generating code corresponding to the sequence of user interactions recorded up to the termination point.

In an embodiment, a monitoring module receives an indication to begin recording interaction with a user interface. In an embodiment, the indication is sent by the automation service. In an embodiment, the indication is received in response to a "record" button or other user interface element accessible to the user of the user interface. Similarly, the monitoring modules may, in an embodiment, receive indications to pause or to stop recording from the automation service, or in another embodiment receive indications to pause or stop recording from a "pause" or "stop" button accessible to the user of the user interface.

In an embodiment, the monitoring module is provided with a mapping between components or elements of the user interface and corresponding user interfaces. For example, certain menu items in a user interface may correspond to automatable tasks. The automation service may provide the monitoring module with this information in order to permit the monitoring module to identify and track interactions with the appropriate user interface elements. Alternatively, or in addition, the automation service maintains information indicative of a mapping between a component of the user interface and a programming interface. In an embodiment, the automation service based code generation at least in part on this mapping, for example by using the mapping to identify an invocation of a programming interface when a corresponding menu item, button, and so forth is selected.

Element 604 depicts an embodiment receiving information indicative of a plurality of interactions with the user interface. In an embodiment, the information is transmitted from the monitoring module to the automation service, and comprises a sequence of records that summarize interactions with a user interface. In an embodiment, the information comprises the sequence of interactions, values of data entered, and indications of which programming interfaces were invoked because of the user interaction, and in what sequence.

Element 606 depicts an embodiment identifying an invocation of the programming interface that resulted from the plurality of interactions. In an embodiment, the automation service receives information indicating which elements of a user interface may trigger an invocation of the programming interface. Upon detecting interaction with such an element, the automation service may identify the corresponding programming interface invocation.

Element 608 depicts an embodiment generating code comprising instructions for performing a second invocation of the programming interface, where the second invocation is based on the prior invocation which occurred during the series of interactions. In an embodiment, when the generated code is executed, the same programming interface is invoked with substantially the same parameters, such that the same or similar effect is achieved.

In an embodiment, the code is generated to comprise instructions for performing an operation performed by the user interface, such as an operation that is preparatory to the invocation of the programming interface by the user interface.

Element 610 depicts an embodiment providing the generated code to a client device. In an embodiment, the client device may execute the code to reproduce the effect of the interaction with the user interface. In an embodiment, the automation service receives code from the client and invokes the programming interface based at least in part on the generated code. In cases and embodiment, the automation service may receive and execute modified code. In cases and embodiments, the automation service may modify the code prior to execution, for example by substituting placeholder values with new values.

Figure 7:
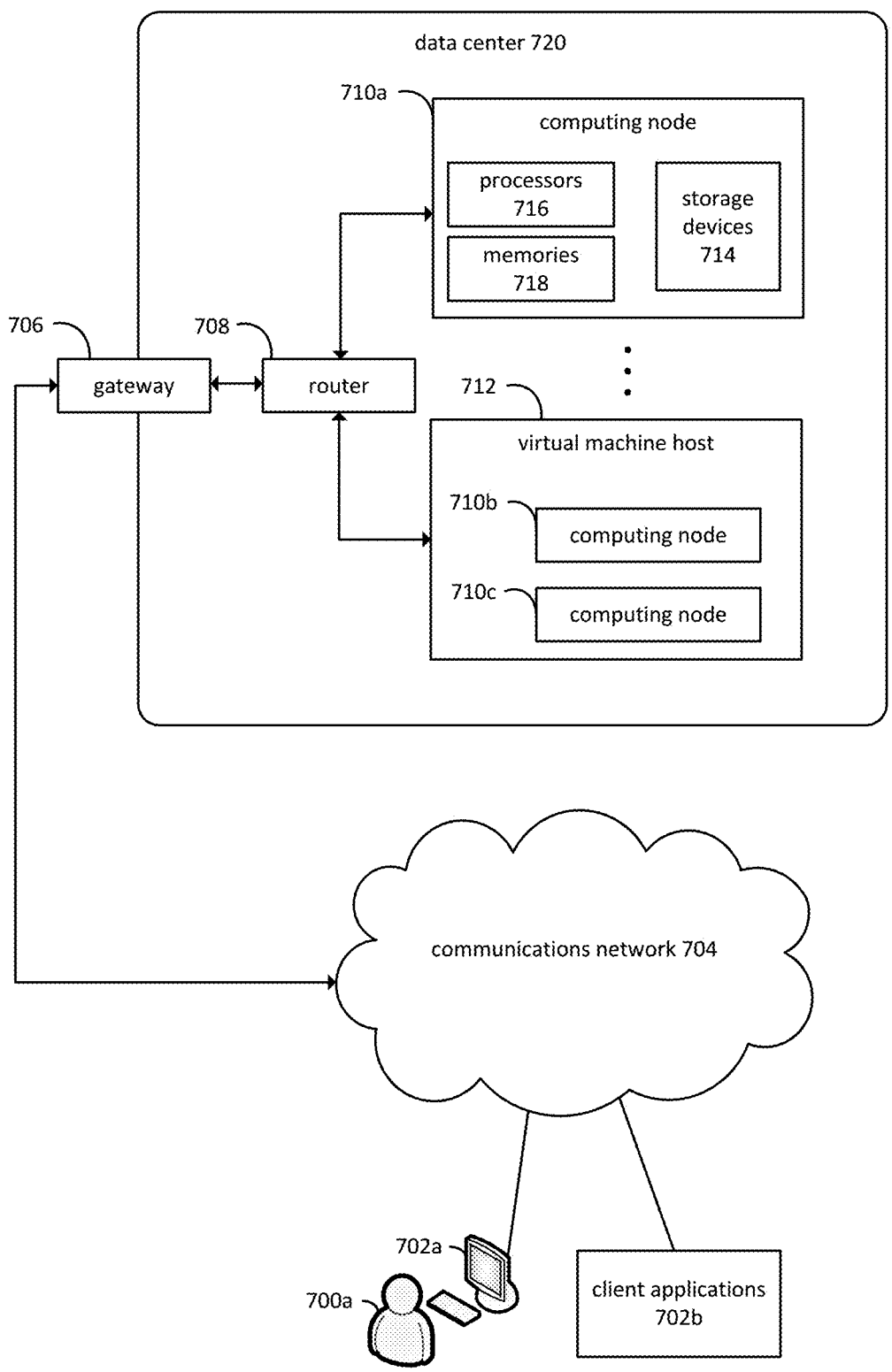
FIG. 7 depicts an embodiment of a computing environment in which aspects of the present disclosure may be practiced.

FIG. 7 is a diagram depicting an example of a distributed computing environment on which aspects of the present invention may be practiced. Various users 700*a* may interact with various client applications, operating on any type of computing device 702*a*, to communicate over communications network 704 with processes executing on various computing nodes 710*a*, 710*b*, and 710*c* within a data center 720. Alternatively, client applications 702*b* may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710*a*, 710*b*, and 710*c*, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
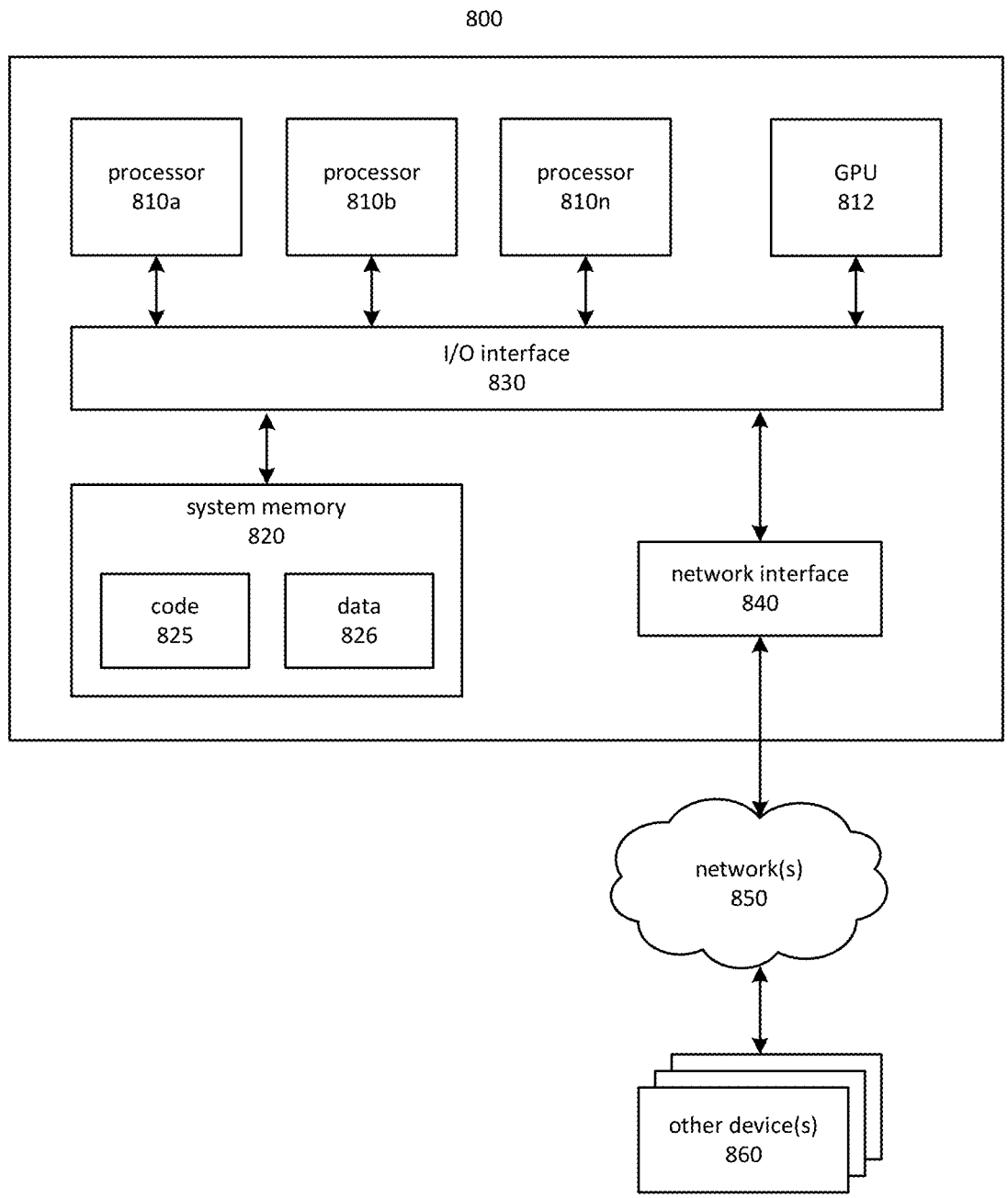
FIG. 8 depicts an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 1210b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 820 may be reconfigured by the operation of one or more of the processors 810. The processors 810 may execute the instructions of a code module and thereby reconfigure the system memory 820 to form data structures and data elements. Forming a data element may therefore refer to operations of the processor 810 to reconfigure the system memory 820. The GPU 812, network interface 840, and I/O interface may also, in some cases, form data structures by reconfiguring the system memory 820. Accordingly, the terms "form" and "forming" may also refer to the operations of these and other devices 860 which may cause the a data structure or data element to be stored in the system memory 820.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a memory to store machine-readable instructions, which as a result of being performed by a processor, cause the system at least to:
receive information indicative of web services configuration actions taken by one or more users to configure a first virtual machine, wherein the received information is indicative of an interaction with an element of a user interface that triggers one or more calls to invoke an application programming interface (API) and first parameters to be sent to the API,
invoking the API to configure the first virtual machine based on the interaction with the element of the user interface;
mapping the information indicative of an interaction that triggers the one or more calls to an API to events and data in preparation of invoking the API;

generating software code from the information indicative of the element of the user interface that triggers one or more calls based on the mapped events and data in preparation of invoking the API, the software code comprising one or more calls to invoke the API associated with configuring one or more web services;

transmitting the software code to the one or more users for execution of the software code to configure at least a second virtual machine, wherein when the software code is executed, the API is invoked with second parameters, wherein at least some of the second parameters are the same as some of the first parameters and some of the second parameters are different.

2. The system of claim 1, the memory to store machine-readable instructions, which as a result of being performed by a processor, cause the system at least to map the interaction that triggers the one or more calls to an API to events and data in preparation of invoking an API comprises:
identifying a first call to the API which is made in response to the interaction with the element of a user interface; and
using the events and data to generate the software code to comprise instructions for making a second call corresponding to the first call.

3. The system of claim 1, the memory to store machine-readable instructions, which as a result of being performed by a processor, cause the system at least to:
transmit information indicative of a mapping between the element of a user interface and the one or more API calls, wherein the element of the user interface is used by the one or more users to take the configuration actions; and
translating the configuration actions into software code based at least in part on the mapping.

4. The system of claim 1, the memory to store machine-readable instructions, which as a result of being performed by a processor, cause the system at least to:
generate the software code to comprise instructions for performing an operation preparatory to the one or more calls to the API.

5. The system of claim 1, the memory to store machine-readable instructions, which as a result of being performed by a processor, cause the system at least to:
receive the software code from a client device; and
invoke the one or more API calls based at least in part on the software code to configure the second virtual machine.

6. The system of claim 1, wherein providing the software code to the one or more users for execution of the software code comprises transmitting the software code over a network to a client device accessible to a user.

7. A method, comprising:
receiving information indicative of web services configuration actions taken by one or more users to configure a first virtual machine, wherein the received information is indicative an interaction with an element of a user interface that triggers the one or more calls to invoke an application programming interface (API) and first parameters to be sent to the API;
invoking the API to configure the first virtual machine based on the interaction with the element of the user interface;
mapping the information indicative of an interaction that triggers the one or more calls to an API to events and data in preparation of invoking the API;
generating software code from the information indicative of the element of the user interface that triggers one or more calls based on the mapped events and data in preparation of invoking the API, including first one or more calls to invoke the API associated with one or more web services; and
transmitting the software code to the one or more users for execution of the software code to configure at least a second virtual machine, wherein when the software code is executed the API is invoked with second parameters, wherein the second parameters are substantially the same as the first parameters and some of the second parameters are different.

8. The method of claim 7, wherein the first one or more API calls correspond to calls made during the configuration actions.

9. The method of claim 7, wherein the software code, when executed, causes configuration actions corresponding to the configuration actions taken by the one or more users to be performed.

10. The method of claim 7, further comprising:
receiving a request to record the configuration actions; and
generating the software code based at least in part on receiving a request to stop recording the configuration actions.

11. The method of claim 7, further comprising:
generating the software code to comprise instructions for performing a function performed by a user interface, the function preparatory to the one or more calls to the API.

12. The method of claim 7, further comprising:
receiving the software code; and
invoking the one or more calls to the API based at least in part on the software code.

13. The method of claim 7, further comprising:
providing a user interface by which the one or more users take the configuration actions;
providing information indicative of a mapping between a component of the user interface and the one or more calls to the API; and
providing client-executable code to monitor interactions with the components of the user interface.

14. The method of claim 13, wherein the client-executable code records the information indicative of configuration actions.

15. A non-transitory computer-readable storage medium bearing executable instructions that, upon execution by a computing device, cause the computing device at least to:
receive information indicative of web services configuration actions taken by a user acting on a user interface to configure a first virtual machine, wherein the received information is indicative an interaction with an element of the user interface that triggers the one or more calls to invoke an application programming interface (API) and first parameters to be sent to the API;
invoke the API to configure the first virtual machine based on the interaction with the element of the user interface;
map the information indicative of an interaction that triggers the one or more calls to an API to events and data in preparation of invoking the API;
generate software code from the information indicative of the element of the user interface that triggers one or more calls, the software code including first one or more calls to the API associated with one or more web services; and
transmit the software code to for execution of the software code to configure at least a second virtual machine, wherein when the generated software code is executed, the API is invoked with second parameters, wherein the second parameters are substantially the same as the first parameters and some of the second parameters are different.

16. The non-transitory computer-readable storage medium of claim 15, comprising further instructions that, upon execution, cause the computing device to at least:
    identify a first call to the API which is made in response to the configuration actions; and
    generate the software code to comprise instructions for making a second call corresponding to the first call.

17. The non-transitory computer-readable storage medium of claim 15, comprising further instructions that, upon execution, cause the computing device to at least:
    provide client-executable code to monitor interactions with the user interface.

18. The non-transitory computer-readable storage medium of claim 15, comprising further instructions that, upon execution, cause the computing device to at least:
    receive a request to execute the software code; and
    cause second configuration actions to be performed by executing the software code, the second configuration actions corresponding to the configuration actions taken by the user.

19. The non-transitory computer-readable storage medium of claim 15, wherein the information indicative of configuration actions comprises information indicative of interactions with the user interface.

20. The non-transitory computer-readable storage medium of claim 15, comprising further instructions that, upon execution, cause the computing device to at least:
    receive the software code; and
    invoke the one or more calls to the API based at least in part on the software code.

21. The non-transitory computer-readable storage medium of claim 20, comprising further instructions that, upon execution, cause the computing device to at least:
    transmit information indicative of a mapping between the element of a user interface and the one or more API calls, wherein the element of the user interface is used by the one or more users to take the configuration actions; and
    translate the configuration actions into software code based at least in part on the mapping.

\* \* \* \* \*